(12) United States Patent
Liang et al.

(10) Patent No.: US 10,100,517 B2
(45) Date of Patent: Oct. 16, 2018

(54) FLOOR UNDERLAYMENT FOR RETAINING HEATER CABLE

(71) Applicant: Pentair Thermal Management LLC, Menlo Park, CA (US)

(72) Inventors: Yu Fan Liang, Surrey (CA); Pete Pretorius, Langley (CA)

(73) Assignee: nVent Services GmbH, Schaffhausen (CH)

( * ) Notice: Subject to any disclaimer, the term of this patent is extended or adjusted under 35 U.S.C. 154(b) by 0 days.

(21) Appl. No.: 15/384,069

(22) Filed: Dec. 19, 2016

(65) Prior Publication Data

US 2017/0175389 A1    Jun. 22, 2017

Related U.S. Application Data

(60) Provisional application No. 62/268,560, filed on Dec. 17, 2015.

(51) Int. Cl.
*E04B 5/48* (2006.01)
*E04F 15/18* (2006.01)
(Continued)

(52) U.S. Cl.
CPC .............. *E04B 5/48* (2013.01); *E04F 15/182* (2013.01); *E04F 15/185* (2013.01);
(Continued)

(58) Field of Classification Search
CPC ..... E04F 15/182; E04F 15/185; E04F 15/187; E04F 15/022; E04F 2290/02;
(Continued)

(56) References Cited

U.S. PATENT DOCUMENTS 2,548,036 A    4/1951   Milborn
2,956,785 A    10/1960  Richl
(Continued)

FOREIGN PATENT DOCUMENTS

CA    2456682 A1    8/2005
EP    1770337 A1    4/2007

OTHER PUBLICATIONS

DITRA-HEAT Brochure; 8 pages; date: Feb. 2014; Copyright 2014 Schluter Systems L.P.
(Continued)

Primary Examiner — Jessica L Laux
(74) Attorney, Agent, or Firm — Quarles & Brady LLP

(57) ABSTRACT

A membrane for decoupling heated flooring from a subfloor includes a flexible base and a plurality of projections formed into the base and extending outward from the base. Each projection of the plurality of projections has a perimeter wall defining a height of the projection and a top surface integral with the perimeter wall for supporting a flooring adhesive and/or for bearing a load when the heated flooring is installed. The projections have one flange portion extending from the perimeter wall and effective for retaining a heater cable within a channel formed between each pair of adjacent projections. Each channel may have exactly one flange portion extending over it and forming an overhang for retaining heater cables of different diameters. The corresponding flange portions of adjacent projections do not face in the same direction or the opposite direction, providing for a minimum number of flange portions to be used.

9 Claims, 6 Drawing Sheets

(51) Int. Cl.
  *H05B 3/56* (2006.01)
  *F24D 3/14* (2006.01)
(52) U.S. Cl.
  CPC ............ *E04F 15/187* (2013.01); *F24D 3/142* (2013.01); *H05B 3/56* (2013.01); *E04F 2290/023* (2013.01); *H05B 2203/026* (2013.01)
(58) Field of Classification Search
  CPC .................. E04F 2290/023; E04B 5/48; H05B 2203/026; H05B 3/46; H05B 3/48; H05B 3/56; H05B 3/28
  See application file for complete search history.

(56) References Cited

U.S. PATENT DOCUMENTS

| | | | |
|---|---|---|---|
| 4,212,348 A | 7/1980 | Kobayashi | |
| 4,250,674 A | 2/1981 | Feist | |
| 4,301,859 A | 11/1981 | Hollemann | |
| 4,326,366 A | 4/1982 | Werner | |
| 4,338,994 A | 7/1982 | Hewing et al. | |
| 4,415,798 A | 11/1983 | Knappe | |
| 4,576,221 A * | 3/1986 | Fennesz | F24D 3/14 165/168 |
| 4,588,125 A | 5/1986 | Lutz | |
| 4,640,067 A | 2/1987 | Hagemann et al. | |
| H239 H | 3/1987 | Franklin et al. | |
| 5,042,569 A | 8/1991 | Siegmund | |
| 5,082,712 A | 1/1992 | Starp | |
| 5,184,438 A | 2/1993 | Takeda et al. | |
| 5,187,907 A | 2/1993 | Takeda et al. | |
| 5,197,244 A | 3/1993 | Takeda et al. | |
| 5,245,805 A | 9/1993 | Takeda et al. | |
| 5,788,152 A | 8/1998 | Alsberg | |
| 6,076,315 A | 6/2000 | Kondo | |
| 6,094,878 A | 8/2000 | Schluter | |
| 6,182,903 B1 | 2/2001 | Fiedrich | |
| 6,270,016 B1 | 8/2001 | Fiedrich | |
| 6,283,382 B1 | 9/2001 | Fitzemeyer | |
| 6,533,185 B1 | 3/2003 | Muir | |
| 6,539,681 B1 | 4/2003 | Siegmund | |
| 6,552,310 B1 | 4/2003 | Hulldin et al. | |
| 6,621,983 B2 | 9/2003 | Thorin | |
| 6,739,097 B1 | 5/2004 | Rodin | |
| 6,805,298 B1 | 10/2004 | Corbett | |
| D508,332 S | 8/2005 | Julton | |
| 7,140,420 B2 | 11/2006 | Arik et al. | |
| D541,396 S | 4/2007 | Fawcett et al. | |
| 7,250,570 B1 | 7/2007 | Morand et al. | |
| D587,358 S | 2/2009 | Stephan et al. | |
| 7,585,556 B2 | 9/2009 | Julton | |
| 7,832,159 B1 | 11/2010 | Kayhart | |
| 8,020,783 B2 | 9/2011 | Backman, Jr. | |
| D654,600 S | 2/2012 | Devine et al. | |
| 8,176,694 B2 | 5/2012 | Batori | |
| D664,098 S | 7/2012 | Liang | |
| 8,288,689 B1 | 10/2012 | Adfelman | |
| D672,028 S | 12/2012 | MacPhee | |
| 8,516,760 B2 | 8/2013 | Julton | |
| 8,597,753 B2 | 12/2013 | Hopkins et al. | |
| 8,684,277 B2 | 4/2014 | Blanke | |
| D706,459 S * | 6/2014 | Schluter | D25/138 |
| 8,752,346 B1 | 6/2014 | Shaw et al. | |
| D721,191 S | 1/2015 | Amend | |
| 8,950,141 B2 | 2/2015 | Schluter et al. | |
| 9,010,060 B2 | 4/2015 | Rapaz | |
| 9,101,060 B2 | 8/2015 | Yamanaka et al. | |
| 9,188,348 B2 | 11/2015 | Larson | |
| 9,328,520 B1 * | 5/2016 | Kriser | E04F 15/182 |
| 2004/0074631 A1 | 4/2004 | Jeon | |
| 2006/0137280 A1 | 6/2006 | Bartnes | |
| 2008/0005988 A1 | 1/2008 | Dombowsky | |
| 2008/0295441 A1 | 12/2008 | Carolan | |
| 2009/0026192 A1 | 1/2009 | Fuhrman | |
| 2009/0217605 A1 | 9/2009 | Batori | |
| 2009/0230113 A1 * | 9/2009 | Batori | E04F 15/18 219/213 |
| 2010/0065548 A1 | 3/2010 | Morand et al. | |
| 2011/0047907 A1 | 3/2011 | Smolka et al. | |
| 2013/0011609 A1 | 1/2013 | Comitale et al. | |
| 2014/0069039 A1 | 3/2014 | Schluter et al. | |
| 2014/0097169 A1 | 4/2014 | Charron | |
| 2015/0021315 A1 | 1/2015 | Blanke | |
| 2016/0010327 A1 | 1/2016 | Larson | |
| 2016/0130803 A1 | 5/2016 | Comitale et al. | |
| 2016/0377300 A1 | 12/2016 | Larson | |
| 2018/0127989 A1 * | 5/2018 | Schluter | E04F 13/0885 |

OTHER PUBLICATIONS

DITRA-HEAT Data Sheet; 8 pages; date: Jun. 2015; Copyright 2015 Schluter Systems L.P.

DH E RT 102/BW Programmable Interactive User Manual; 63 pages; Copyright 2015; all rights reserved; used under license by Schluter-Systems L.P.

DITRA-HEAT Installation Handbook 2015; 28 pages; date: Apr. 2015; Copyright 2015 Schluter Systems L.P.

DITRA-HEAT 10-Year Limited Warranty; 1 pages; Schluter Systems L.P.;194 Pleasant Ridge Road, Plattsburgh, NY, 12901-5841; Tel.: 800-472-4588; Fax: 800-477-9783; info@schluter.com; Schluter Systems (Canada) Inc.; 21100 chemin Ste-Marie, Ste-Anne-de-Bellevue, QC H9X 3Y8; Tel.: 800-667-8746; Fax: 877-667-2410; info@schluter.com.

EASYMAT with SoundGard Technology Data Sheet; 2 pages; custombuildingproducts.com.

System Platon Data Sheet; 1 page; Isolam N-3945 Porsgrunn, Norway; www.isola.com.

PROVA FLEX-HEAT Brochure; 2 pages; Loxcreen Flooring Group; 5720 Ambler Drive, Mississauga, ON, L4W 2B1; Telephone: 1 800 565 6653; E-mail: info@loxcreenflooring.com; Website: www.loxcreenflooring.com.

Prosecure Fibretec Reinforcement Brochure; 2 pages; Proline Systems GmbH; Kratzenburger Landstraße 3, Industriegebiet Hellerwald, 56154 Boppard—Germany, Postfach 4153, 56149 Boppard—Germany, Phone +49 67 42/80 16-0, Fax +49 67 42/80 16-40, E-mail info@proline-systems.com, Internet www.proline-systems.com.

NobleSeal CIS Sheet Membrane Installation Instructions; 4 pages; Noble Company; P.O. Box 350, Grand Haven, MI 49417-0350, 800-878-5788, Fax: 231-799-8850, www.noblecompany.com.

NobleSeal TS Sheet Membrane Installation Instructions; 6 pages; P.O. Box 350, Grand Haven, MI 49417-0350, 800-878-5788, Fax: 231-799-8850, www.noblecompany.com.

NobleSeal CIS Crack Isolation Membrane Brochure; 2 pages; P.O. Box 350, Grand Haven, MI 49417-0350, 800-878-5788, Fax: 231-799-8850, www.noblecompany.com.

NobleSeal TS Thin-Bed Waterproofing Membrane; 2 pages; P.O. Box 350, Grand Haven, MI 49417-0350, 800-878-5788, Fax: 231-799-8850, www.noblecompany.com.

PROVA FLEX-HEAT underlayment; 4 pages; Loxcreen Flooring Group; dated Feb. 24, 2016.

Case Study; Radiant Shines in Corporate Headquarters; 2 pages; by Ronald Gagnon; Mechanical Business 10.12.

2015 Illustrated Price List; 132 pages; Schluter-Schiene; Effective Mar. 1, 2015; Dated: Jun. 2015; Copyright 2015 Schluter Systems L.P.

Showcdase of Innovation; 3 pages; by Kimberly Rielly; As appeared in Contemporary Stone and Tile Design; Schluter Systems L.P.;194 Pleasant Ridge Road, Plattsburgh, NY, 12901-5841; Tel.: 800-472-4588; Fax: 800-477-9783; info@schluter.com; Schluter Systems (Canada) Inc.; 21100 chemin Ste-Marie, Ste-Anne-de-Bellevue, QC H9X 3Y8; Tel.: 800-667-8746; Fax: 877-667-2410; info@schluter.com.

TEC Sturdi Flex—Latex Modified Thin Set Mortar; 2 pages; Product Data; Copyright 2010 H.B. Fuller Construction Products Inc.

Kerabond/Keralastic System Premium, Flexible Tile Mortar; 4 pages; Product Specification; Copyright 2014 MAPEI Corporation.

(56) References Cited

OTHER PUBLICATIONS

Kerabond Premium Tile Mortar; 4 pages; Product Specification; Edition Date: Jun. 9, 2010; Copyright 2010 MAPEI Corporation.
International Search Report and Written Opinion for PCT/US16/67590; 44 pages; dated Apr. 21, 2017.

* cited by examiner

FLOOR UNDERLAYMENT FOR RETAINING HEATER CABLE

CROSS-REFERENCE TO RELATED APPLICATIONS

This is a non-provisional application claiming the benefit of priority from U.S. Prov. Pat. App. Ser. No. 62/268,560, filed Dec. 17, 2015, under the same title, incorporated fully herein by reference.

BACKGROUND

Under-floor heating systems are used to create heated floors in buildings. In some systems, one or more heat-radiating wires, known as "heater cables," are disposed between a subfloor surface and a main floor surface. Once activated, the heater cables transmit heat to the main floor surface, which may then be heated to a desired temperature. To provide an effective and consistent heating area, the heater cables are arranged in a particular pattern. To that end, one or more wire retaining apparatuses may be utilized to hold the heater cables in a certain orientation and spacing to achieve a desired power output within a given area. In one approach, the wire retaining apparatus is a plurality of strips coupled together and/or attached to the subfloor (or other surface). The heater cables are coupled to the strips to maintain the heater cables in the desired orientation. Adhesive (e.g., concrete or mortar) may be poured and the main flooring may be installed on top of the heater cables such that the cables are positioned adjacent and/or are in contact with an underside of the main floor.

In another approach, a rigid or flexible underlayment may be laid on the subfloor. The underlayment includes a base that covers all of the area of the floor to be heated. An arrangement of projections extend upward from the base and, depending on the arrangement, can serve multiple purposes. First, the projections can create a primary or secondary bonding surface, such that concrete, mortar, or another adhesive contacts both the tops of the projections and the base layer exposed between the projections. This potentially improves adhesion of the adhesive as it dries or cures. Second, the projections can partially decouple the overlaying flooring from the subfloor by creating voids in the adhesive. These voids can facilitate movement of the subfloor without transmitting the movement through to the flooring. This decoupling prevents or reduces cracking (e.g., in tile or grout) and other undesired movement or effects caused by the movement of the subfloor. Third, the projections can be a partially or fully load-bearing surface, distributing loading forces across the surface area of the top and into the surrounding base as desired.

Finally, the projections can be shaped, positioned, and structurally configured to retain the heater cables within channels between the projections. In some existing implementations, the projections are spaced close enough together to hold a heater cable of a certain diameter within the channel by friction fit. In other implementations, the heater cable is placed in the channel, and then a flange is placed over the projection to extend over part or all of the channel and retain the heater cable therein. Still other implementations include flanges or recesses integrated into some or all of the projections, creating a channel which is large enough for a heater cable of a desired diameter, but which has an opening that is smaller than the heater cable; the heater cable is thus "snaked" (if the corresponding overhang over the channel is rigid) or "snapped" (if the overhang is flexible and/or resilient) into the channel.

A distinct advantage of flexible underlayments comes from manufacturing efficiencies. The base, which is typically polyethylene, is extruded as a thin sheet. The projections are stamped or thermoformed into, but can be bonded to, the base. In some implementations, a fibrous liner is bonded to the underside (i.e., opposite the projections) of the base. This liner allegedly provides additional bonding and/or decoupling properties to the underlayment in existing systems. The flexible underlayment is lightweight and can be rolled, similarly to a carpet, for easy installation.

Known underlayments have numerous drawbacks. For example, they are designed for a heater cable with a particular diameter, and it may be difficult or impossible to secure heater cables of different sizes to the underlayment because the retaining element does not grip or otherwise interact with the heater cable in a manner to secure the wire thereto. Thus, when a smaller diameter cable is used, extra care and effort is necessary to keep the cable properly tensioned so as to prevent the wire from lifting away through curling; when a larger diameter cable is used, the retaining elements (i.e., the channel, flanges, recesses, etc.) may not be flexible enough to accommodate the cable. A further drawback of some of the more versatile underlayments described in the existing art is that they have proved to be too difficult or too costly to manufacture, due to overly complicated structuring and arrangement of the projections. For example, projections that are too small or have large or abnormally-shaped flanges cannot be consistently manufactured by an efficient thermoforming process.

SUMMARY

Described embodiments provide a heater cable retaining membrane for installation between a subfloor and a main flooring to facilitate heating the flooring. The membrane may include a base and a plurality of projections extending outwardly from the upper side of the base. Each retention member includes a perimeter wall defining an outer shape of the projection and a top surface that is substantially parallel to the base. Some or all of the projections may include one or more flange portions. The flange portion extends away from the perimeter wall at a point at or below the top surface of the projection, creating an overhang under which a heater cable may be retained. The arrangement of the projections, with and without the flange portions, facilitates retention by the membrane of heater cables of varying sizes traveling in four or more directions across the membrane.

In one described embodiment, the perimeter wall has a long base portion, a left leg portion, a short base portion, and a right leg portion together defining the shape of each projection as substantially a trapezoid. The trapezoid may have rounded corners, allowing a heating cable to maintain contact with the perimeter wall as the heating cable is bent around the projection. The top surface may cover the entirety of the interior of the trapezoid. A hole, slit, or other aperture may be disposed through the top surface, facilitating off-gassing of an adhesive or transmission of the adhesive (or of water or another liquid) from one side of the membrane to the other. With respect to the perimeter wall, the projections may be arranged such that each long base portion of a projection opposes the long base portion of another projection, and each leg portion of a projection opposes the opposite leg portion of another projection, the opposition in each case forming a channel between the opposing portions. The channel may be sufficiently wide to receive any heating cable having a diameter up to a maximum diameter. Each projection may have one flange portion formed into either the long base portion, the left leg portion, the short base portion, or the right leg portion. The projections may be arranged so that no adjacent protrusions have flange portions that either oppose each other or extend in the same direction.

In another described embodiment, the perimeter wall may be substantially circular. The projections may be circles of varying sizes. The projections may be annular, having an outer perimeter wall and an inner perimeter wall that are both circular. In one embodiment, the top surface may extend between the outer and inner perimeter walls, leaving a circular recess within each projection. In another embodiment, the outer perimeter wall may be shorter than the inner perimeter wall, and an intermediate portion may extend outward from the base and radially at an angle to the base to meet the top surface. The recess may extend down to the base of the membrane. One described arrangement of the projections includes projections of two different diameters; projections of like diameter align orthogonally with each other and are spaced uniformly along the orthogonal axes, and projections of unlike diameter are oriented at 45 degrees from each other and also spaced uniformly apart. The smaller projections each have at least one flange portion, and the larger projections do not have flange portions. In one embodiment, each small projection may have four flange portions extending from the top surface and/or from the top of the outer perimeter wall. The flange portions may be oriented so that, for each of the smaller projections, none of the flange portions oppose or extend in the same direction as any of the flange portions of the adjacent smaller projections.

In another described embodiment, a membrane for decoupling heated flooring from a subfloor includes a flexible base and a plurality of projections formed into the base and extending outward from the base, each projection of the plurality of projections having a perimeter wall, a top surface integral with the perimeter wall, and a flange portion extending from the perimeter wall, and a plurality of channels may each be defined by the base and the corresponding perimeter walls of a pair of adjacent projections of the plurality of projections. The plurality of projections may be arranged so that the corresponding flange portion of each projection does not face the same direction or the opposite direction of the corresponding flange portion of any other projection adjacent to the projection. For each channel of the plurality of channels, the corresponding flange portion of at most one of the projections forming the channel may extend over the channel, such that the channel retains a heater cable for heating the heated flooring. The perimeter wall can be circular, or can have a trapezoidal shape. The perimeter wall can include a planar first base portion, a planar first leg portion adjacent to the first base portion, a planar second base portion adjacent to the first leg portion and parallel to the first base portion, and a planar second leg portion adjacent to the first base portion and the second base portion, and a plurality of rounded corners each disposed between and integral with two adjacent portions of the perimeter wall.

The perimeter wall of each projection can define an interior of the projection, and wherein the top surface of each projection is a substantially planar surface extending over the entirety of the interior of the projection. Each projection of the plurality of projections can further include a slit disposed through the top surface to allow transmission through the membrane of one or more of a gas, a liquid, and a flooring adhesive, the corresponding slits of two or more of the plurality of projections forming a straight line from a first end of the membrane to a second end of the membrane opposite the first end. The perimeter wall of each projection can include a plurality of integral sides that cooperate to define a shape of the projection, a first side of the plurality of sides extending toward the corresponding top surface of the projection at an angle that is oblique to the base to form the corresponding flange portion of the projection. Each side of the plurality of sides other than the first side can be perpendicular to the base.

In another embodiment, the present disclosure provides a membrane for decoupling heated flooring from a subfloor. The membrane can include a flexible base and a plurality of projections formed into the base and extending outward from the base, each projection of the plurality of projections having a plurality of sides including a first side extending at an angle that is oblique to the base. The plurality of projections can be arranged into a plurality of pairs of adjacent projections wherein, in each of the pairs, the corresponding first side of a first adjacent projection cooperates with a second facing side, being one of the corresponding plurality of sides of a second adjacent projection other than the corresponding first side of the second adjacent projection, to define a corresponding channel of a plurality of channels for retaining a selected heater cable. Each of the plurality of sides other than the first side can be perpendicular to the base. The corresponding first side of each of the plurality of projections can face neither the same direction nor the opposite direction of the corresponding first side of any other projection adjacent to the projection.

The membrane further provides protection against fracture of the flooring by effectively decoupling the flooring from the subfloor. The projections may be essentially uniform in height and may have coplanar (with each other) top surfaces. In this manner, the projections can distribute loading forces and absorb shearing forces more forgivingly than if the flooring were installed on the subfloor. The membrane may further include a fibrous layer bonded to the base opposite the projections. The fibrous layer may be made of fleece or a similar natural or synthetic fiber, and may have a uniform or non-uniform density. The fibrous layer can provide an improved bond of the membrane to the subfloor. Additionally, the fibrous layer can provide decoupling effects between the subfloor and the flooring. Finally, the density/ies of the fibrous layer can be selected to provide heat and/or sound insulating properties in the membrane.

The membrane, and components thereof, may be fabricated with one or a combination of several efficient manufacturing methods. For example, the membrane can be produced by continuous extruding onto a vacuum roller, roll-forming, or thermoforming in a parallel die-set. Other sheet forming techniques suitable for continuous high volume manufacturing can also be considered. The membrane may be lightweight and sufficiently flexible to be rolled, such as onto a spool on onto itself. To install heated flooring, discrete segments of the membrane may be carried to the installation site by a single installer. Each segment may be rolled out and then cut to the desired shape. Each segment may be laid on an adhesive applied to the subfloor or to another sublayer of the floor (e.g., an insulating layer) to cover the desired area. The installer may install a desired heating cable by placing the cable against the projections along the desired cable path, altering the cable's direction and pressing the cable beneath abutting flanges as needed to keep the cable in place. The installer may attach the heating cables to the appropriate control modules, and then may apply thinset or another adhesive over the membrane, the adhesive contacting the heater cables and the top surfaces of the projections and filling in the channels and other spaces between and/or within the projections. The installer may then lay the flooring on top of the adhesive.

DETAILED DESCRIPTION

Figure 1:
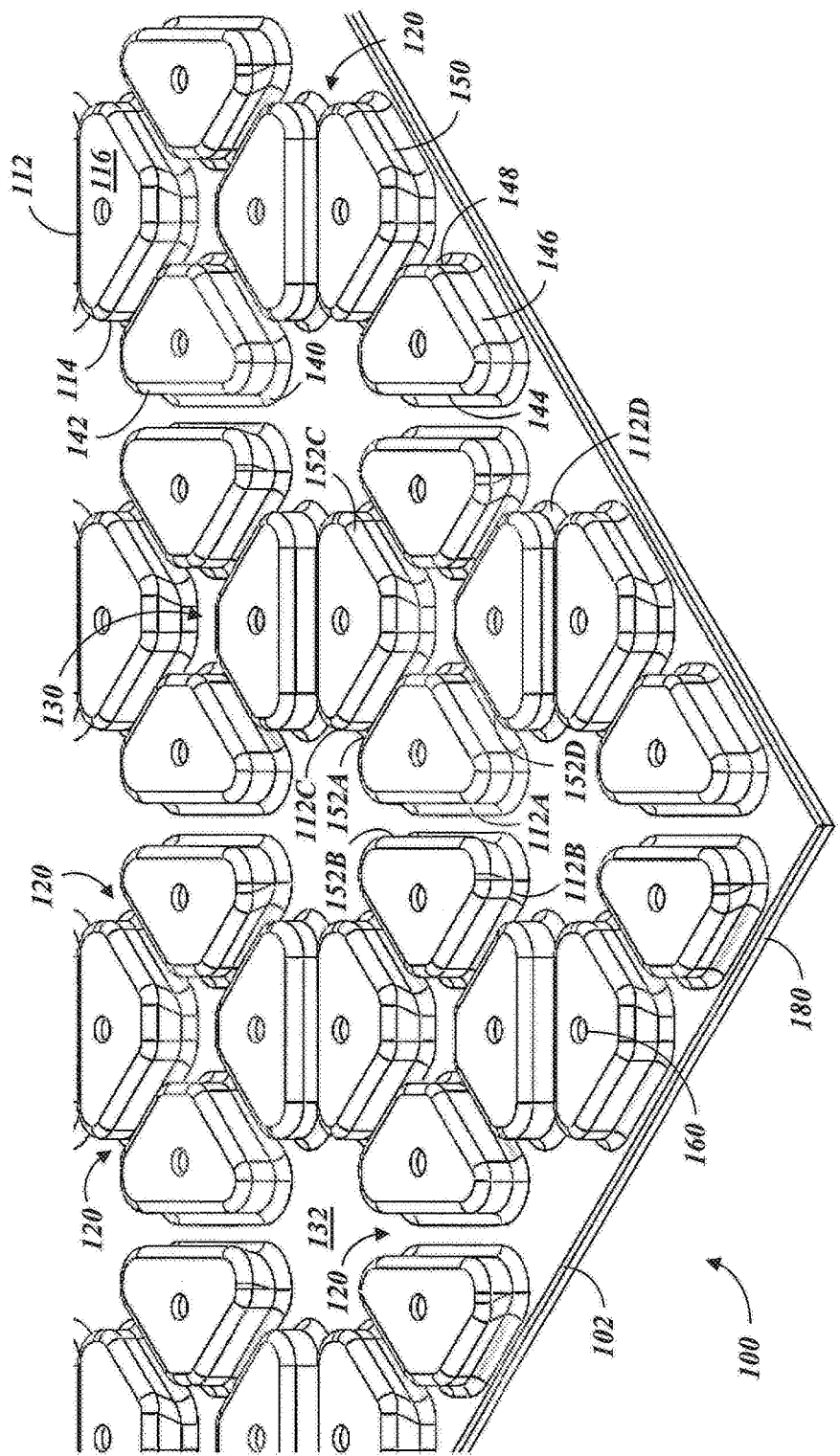
FIG. 1 is an isometric view of a first embodiment of a membrane for retaining heater cables in accordance with the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the present disclosure provide a system and a method for positioning and retaining one or more heater cables in a desired orientation during construction of a heated floor. The described system includes a flexible, lightweight membrane that overlays a subfloor of a building and serves as an underlayment to a main flooring that provides the exposed floor surface. The membrane is configured to guide the heater cables along multiple and variable paths, and to retain the heater cables within the selected paths as the main flooring is installed over the membrane. Configuring the heater cable paths and orientations is simple and versatile using the membrane, enabling a single installer to lay multiple different sizes of heater cable within a desired area. The membrane can be used in a number of applications including residential and commercial flooring, roofing, walls, siding, and the like. For clarity of the disclosure, the membrane is described below as being used in a floor. It will be understood that terms such as "upward," "downward," "top," and "bottom" are used with respect to the floor and have obvious corresponding directional terms when the membrane is used in walls, ceilings, and other structures. It is also contemplated that the described membrane may be utilized for retaining different types of cables, such as coaxial and other electrical cable.

Figure 2:
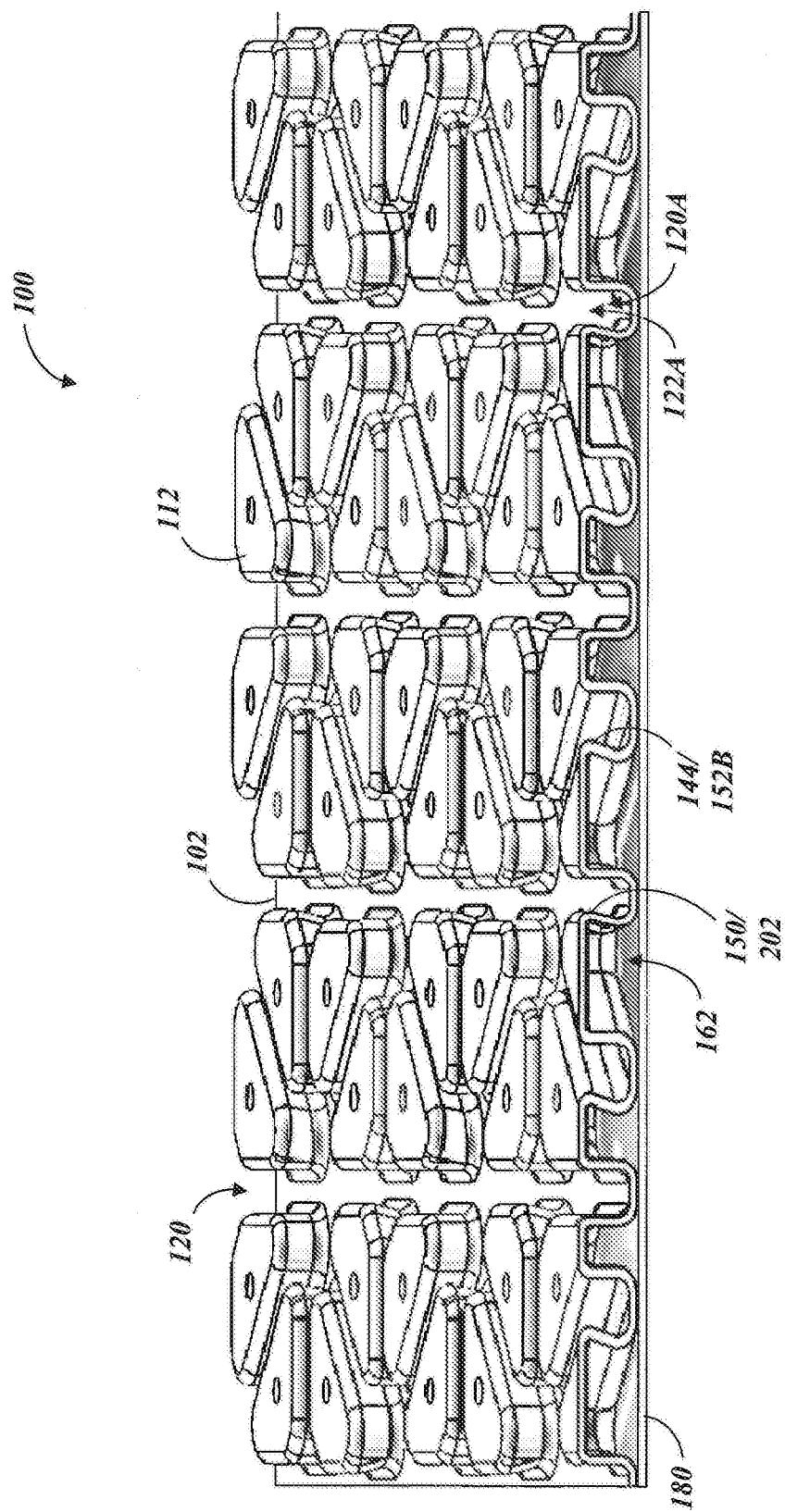
FIG. 2 is a top perspective cross-sectional side view of the membrane of FIG. 1.
Figure 3:
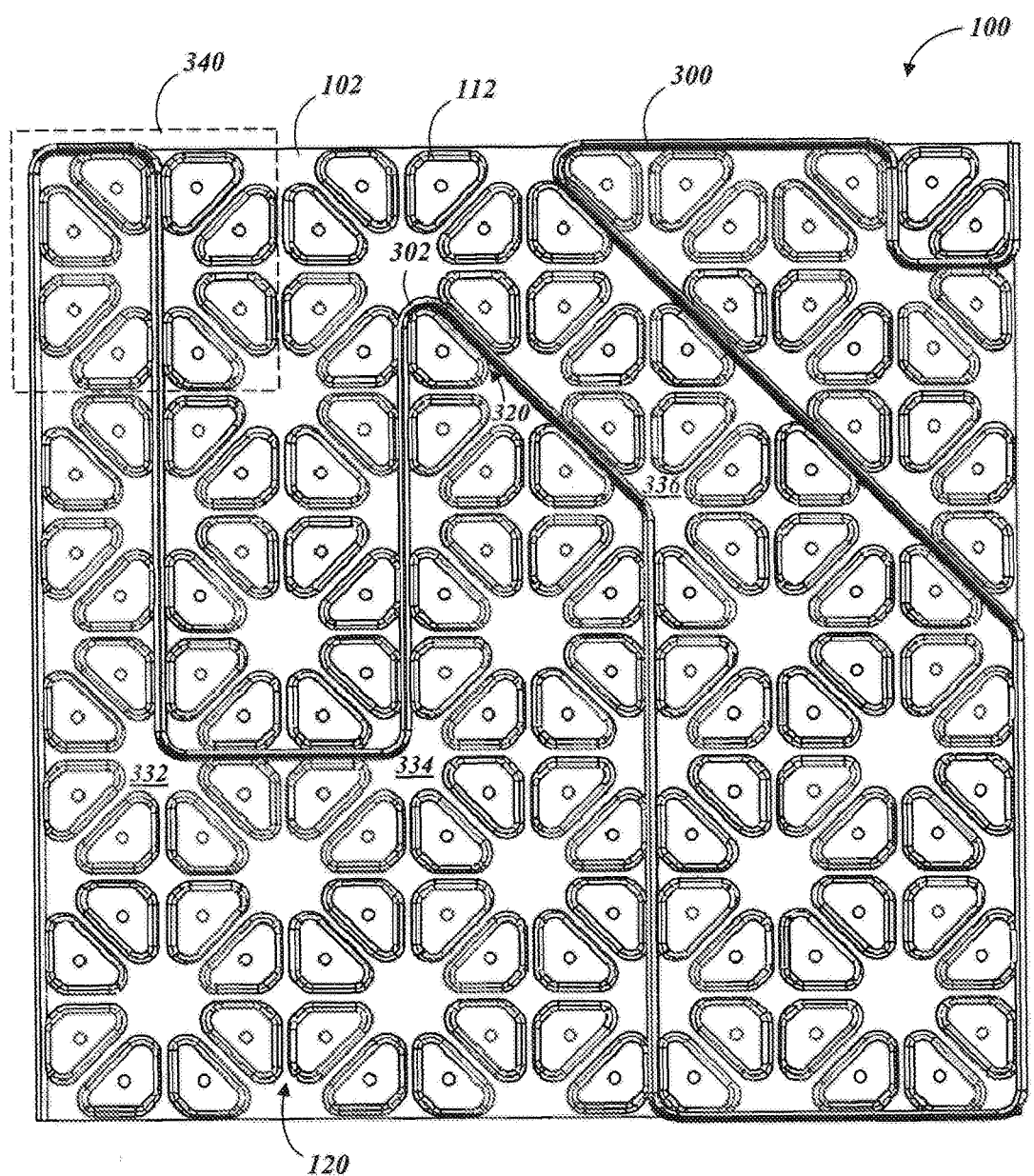
FIG. 3 is a top view of the membrane of FIG. 1.

FIGS. 1-3 illustrate a membrane 100 according to one embodiment. The membrane 100 includes an elongate, sheet-like base 102 and a plurality of projections 112 extending outward (upward, for a floor underlayment) from a top surface 104 of the base 102. The base 102 may be made of any suitable material, particularly a material that is flexible, lightweight, installable in concrete and other typical flooring adhesives, impermeable to water, and usable in one of the preferred manufacturing methods described herein. While flexible, the base 102 may have a suitable stiffness to accommodate the installer walking and kneeling on the base 102 without collapsing or otherwise damaging the membrane 100. In some embodiments, the base 102 material may be extrudable, roll-formable, and/or thermoformable, and may be metallic, polymeric, or both, including any suitable alloy, compound, or combination of materials that exhibit the desired flexibility, weight, permeability, and other features and can be formed into a thin sheet. Non-limiting examples of such materials include polyethylene and polypropylene.

The base 102 may have any suitable thickness, such as within the non-limiting exemplary range of about 0.5 mm to about 5 mm. In some embodiments, the thickness may be selected to accommodate thermoforming or roll-forming of the projections 112 into the base 102. The base 102 material may exhibit additional desirable properties, including without limitation: low memory (i.e., rolls out flat); dielectric and other insulating properties; porosity that allows permeation of certain gasses; tear and crack resistance while remaining cuttable by standard hand tools; heat tolerance (e.g., up to 150 deg F. continuous exposure); and the like. In some embodiments, the base 102 can include compositions that provide heat insulating and/or sound insulating properties to the membrane 100. Such properties may be provide by, for example, a layer of heat- and/or sound-insulating material within the base 102, or by combining, doping impregnating, or otherwise incorporating a heat- and/or sound-insulating material into the core material (e.g., polyethylene) to form the base 102 material. The base 102 may include features that improve adhesive bonding, cable retention, and/or other functionality. In one example, the top surface 104 may be textured or porous, which can improve adhesion of concrete or thin-set applied over the top of the membrane 100, and further can increase friction with an abutting heater cable 300 and prevent the cable from slipping. In another example, one or more apertures (not shown) may be disposed through the base 102 to allow an adhesive to pass through the base 102 or to cure with air contained within or beneath the aperture.

The projections 112 may be integral with or bonded to the base 102. In some embodiments, the projections 112 may be formed into the base 102 via thermoforming, roll-forming, or another suitable technique. In other embodiments, the projections 112 may be formed by cutting away material, such as from a slab of polyethylene. In other embodiments, the projections 112 may be fabricated separately and bonding to the top surface 104 of the base 102 using any suitable bonding agent. The projections 112 may be the same material and may exhibit the same properties (e.g., described above) as the base 102. The projections 112 may be solid or partially or completely hollow. For example, the thermoforming process may create a projection 112 with a perimeter wall 114 defining the shape of the projection 112, and a top surface 116 integral with the perimeter wall 114 and defining a cavity 162 (see FIG. 2) inside the projection 112. The walls and surfaces of the projections 112 may have uniform or non-uniform thickness, and each thickness may be the same as the base 102 or slightly thicker or thinner than the base 102 as a result of the manufacturing process. The top surface 116 may be textured to improve bonding of concrete, thin-set, or another suitable adhesive to the membrane 100.

The illustrated embodiment of the projection 112 of FIGS. 1-3 will now be described in detail; it will be understood that various embodiments of a projection 112 may include, omit, or adapt each of the described features according to the desired functionality and/or manufacturability of the membrane 100. The perimeter wall 114 may be substantially perpendicular to the base 102, extending upward to define the height of the projection 112. The height may be selected according to one or more of the following considerations, among others: desired maximum heater cable diameter; base 102 material and thickness; desired minimum bend radius when rolling the membrane 100; spacing and orientation of projections 112; and the like. A suitable range of perimeter wall 114 height may be up to about 5 mm. In a particular embodiment for retaining heating cable with a diameter of up to 4.75 mm, the projections 112 may be about 3.5 mm tall. Such a membrane 100 retains the heater cables even though the cable diameter is greater than the height of the projections 112 due to the projection 112 configurations described below. The load-bearing and cable-retention functions of the projections 112 may be improved by including an outward-curving portion 140 where the perimeter wall 114 meets the base 102. An inward-curving portion 142 of the perimeter wall 114 may intersect the top surface 116.

The perimeter wall 114 can define any suitable shape for the projection 112. The illustrated projection 112 is a trapezoid, the perimeter wall 114 including a long parallel portion 144, a right leg portion 146, a short parallel portion 148 that is parallel to the long parallel portion 144, and a left leg portion 150. The corners formed by the intersection of two portions 144-150 of the perimeter wall 114 may be curved at a radius that allows a suitably sized heater cable 300 to bend around the corner (e.g., at bend 302 of FIG. 3). In some embodiments, the short parallel portion 148 may be so short that it is effectively incorporated into the curvature of the adjacent corners; thus, the trapezoid becomes a triangle with the right leg portion 146 intersecting the left leg portion 150.

One or more of the portions 144-150 in each projection 112 may include a flange portion 152A, 152B, 152C, 152D at or below the top surface 116 and extending outward (i.e., away from the interior of the projection 112). In some embodiments, the flange portion 152A-D may be formed into or otherwise integral with the corresponding portion 144-150 of the perimeter wall 114. Alternatively, the flange portion 152A-D may be bonded or otherwise attached to the corresponding portion 144-150. In one embodiment, the flange portion 152A-D may be formed by expanding the perimeter wall 114 outward at the top surface 116. This may cause the corresponding portion of the perimeter wall 114 to angle outward, rather than be perpendicular to the base 102, as shown by the cross-section of FIG. 2: the long parallel portion 144 incorporating flange portion 152B, and the left leg portion 150 of an adjacent projection incorporating a corresponding flange portion 202, are each angled outward from the bottom to the top of the corresponding projection. In other words, the perimeter wall 114 portion incorporating the flange forms a side of the projection 112 that is oblique or slanted with respect to the base 102 and optionally also with respect to the top surface of the projection 112. In such embodiments, the other sides of the projection (i.e., portions of the perimeter wall 114) may be perpendicular to the base 102. Correspondingly, the corner where the perpendicular sides of the projection 112 meet the base 102 may be rounded with a first radius, and the corner where the oblique (i.e, flanged) side of the projection 112 meets the base 102 may be rounded with a second radius that is less than the first radius. In other embodiments, the perimeter wall 114 may remain perpendicular and the flange portion 152A-D may "jut" out of the perimeter wall 114, as described below with respect to FIG. 6. Additionally or alternatively, the flange portion 152A-D may be formed by drawing the perimeter wall 114 inward (i.e. toward the interior of the projection 112) near the base 102.

A finishing step of the manufacture of the membrane 100 may include cutting the membrane 100 into segments of a suitable size for the desired application. For example, a segment for residential home installation may be a standard size such as one meter wide and 12.5 m long. The projections 112 may be configured in a prescribed layout on the base 102 in each segment. The layout may determine the size, number, orientation, and spacing of the projections 112, and may further determine the number and location of the flange portions 152A-D, if any, on each projection 112. The projections 112 may be coordinated so that each projection 112 cooperates with its adjacent projections 112 to create channels 120 for retaining the heater cables along a desired path. A projection 112 is adjacent to another projection 112 if the projections 112 have opposing sides that are parallel and create a channel 120. For example, in FIG. 1 projection 112A is adjacent to projections 112B, 112C, and 112D, and is not adjacent to any other projections 112.

The channels 120 may be the same width or may be varying widths. The heater cables may be retained in the channels 120 via one or more of several mechanisms. A heater cable 300 may be held in place within the channel(s) 120 by tension, such as when the heater cable exits the channel 120 and makes a sharp turn, which holds the heater cable against the perimeter wall 114 of one of the corresponding projections 112. FIG. 3 illustrates, for example, the heater cable 300 retained in the channel 320 due to the bend 302. A channel 120 may have a width that retains a heater cable of a certain diameter (e.g., the maximum diameter for the membrane 100 design) by friction fit. Or, a channel 120 (e.g., channel 120A of FIG. 2) may have an overhang formed by extension into the channel 120 of a flange portion 152A-D of one or both of the corresponding projections 112. The flange portion 152A-D narrows the top (e.g., top 122A)

of the channel 120 to a width that is smaller than the diameter of at least one, and preferably all, of the heater cables within a prescribed range of sizes to be used with the membrane 100. Thus, the range of compatible heater cables may be determine by one or more of the depth of the channels 120, the width of the channels 120 at the bottom of the channel 120 (i.e., at or near the base 102), and the width of the channels 120 at the top of the channel 120. For example, the illustrated embodiment may accommodate heater cables ranging from about 4.1 mm to about 4.75 mm in diameter. The heater cable may be pressed through the top of the channel 120 or fed under the overhang of the channel 120 and may be loosely (or tightly, if the channel 120 also holds the heater cable by friction fit) retained by the corresponding flange portion(s) 152A-D.

Various arrangements of flange portions 152A-D may provide effective retention of the heater cables. FIGS. 1-5 illustrate advantageous embodiments in which each projection 112 has only one flange portion 152A-D extending from one portion of the perimeter wall 114. Limiting the flange portions 152A-D to one per projection 112 provides manufacturing efficiencies over other embodiments that provide multiple flange portions 152A-D on each projection 112; yet, the projections 112 can be arranged so that each channel 120 is overhung by the flange portion 152A-D of one of the corresponding projections 112. In one such arrangement, which is illustrated, the following conditions are met: each projection 112 has one flange portion 152A-D; the flange portion 152A-D is on the long parallel portion 144, the right leg portion 146, or the left leg portion 150; and, no two adjacent projections 112 have their respective flange portions 152A-D on portions of their respective perimeter walls 114 that face the same or opposite directions. FIG. 1 illustrates the last condition—with the flange portion 152A of projection 112A located on the left leg portion: the flange portion 152B of projection 112B cannot be on the left leg portion, which faces the opposite direction from the left leg portion of projection 112A; the flange portion 152C of projection 112C cannot be on the right leg portion, which faces the opposite direction from (and also opposes) the left leg portion of projection 112A; and, the flange portion 152D of projection 112D cannot be on the right leg portion, which faces the same direction as the left leg portion of projection 112A.

Since no two opposing portions of adjacent projections 112 can both include flange portions 152A-D, the illustrated arrangement provides that at most one of the two adjacent projections 112 forming a particular channel 120 has its flange portion 152A-D overhanging the channel 120. This makes the channel 120 easier for the installer to use, only having to press the heater cable past one flange portion 152A-D. Additionally, the conditions of the illustrated embodiment may create channels 120 with no overhangs. These channels 120 can be used to retain a heater cable that cannot fit within the channels 120 that do have overhangs, increasing the range of compatible heater cable sizes. Additionally, when the projections 112 each have multiple flange portions, the flange portions that face in different directions can cause the projection 112 to interlock with the mold during manufacture. The requirement that the projections 112 each have only one flange portion 152A-D ensures easy release from the mold.

Adjacent and non-adjacent projections 112 may cooperate to create spaces 130, 132 of various sizes. The heater cables can pass through these spaces and/or change direction within them. For example, the illustrated smaller space 130 allows the heater cable to pass straight through or to turn 90 degrees to the left or right, while the larger space 132 allows the heater cable to pass straight through or to take left or right turns in 45 degree increments, creating seven possible paths through the larger space 132. The spaces 130, 132 may be large enough to accommodate multiple passes of heater cable through them. FIG. 3 demonstrates a potential path for a heater cable 300, extending through multiple channels 120, 320, turning freely at various angles within the provided spaces (e.g., 90 degrees in two spaces 332, 334 and 45 degrees in one space 336), and abutting a projection (e.g., projection 312) to make sharper turns of over 90 degrees (e.g., at bend 302).

In some embodiments, the layout of the projections 312 may include a repeating pattern of projections 312 in different orientations, sizes, and/or configurations. The illustrated example includes a group 340 of eight uniformly sized projections 312 that each have a combination of orientation with flange portion 152A-D location that is different from the other projections 112 in the group 340; the group 340 is repeated in orthogonal directions to create the two-dimensional layout.

In addition to the beater cable retention functionality, the membrane 100 may further provide protection against fracture of the flooring by partially or completely decoupling the flooring from the subfloor and by redirecting, attenuating, and otherwise distributing load and shear forces so such forces do not cause damage to the flooring. In some embodiments, the projections 112 may be essentially uniform in height, and the top surfaces 116 of the projections 112 may be coplanar. The projections 112, and to an extent the base 102, may be sufficiently resilient to serve, effectively, as shock absorbers. Referring again to FIGS. 1 and 2, the membrane 100 may further include a fibrous layer 180 bonded to the base 102 opposite the projections 112. The fibrous layer 180 may be made of fleece or a similar natural or synthetic fiber, and may have a uniform or non-uniform density. The fibrous layer 180 can provide further decoupling of the flooring from the subfloor. In particular, loose fibers within the fibrous layer 180 can slide past each other in response to loading, shearing, or shifting of the flooring or subfloor, absorbing or attenuating such forces. The fibrous layer 180 may further provide an improved bond of the membrane 100 to the subfloor. The density/ies of the fibrous layer 180 can be selected to provide heat and/or sound insulating properties in the membrane 100. In some embodiments, the fibrous layer 180 may have multiple varying densities, and may further have other varying properties that contribute to heat and/or sound insulation, such as reflective properties and heat conductivity.

As with the base 102, the top surface 116 of one or more of the projections 112 may be perforated to facilitate transmission of an adhesive through the membrane 100 and/or curing of an applied adhesive. In one embodiment, shown in FIGS. 1-3, one or more holes 160 may be formed through the top surface 116. The holes 160 may be formed during thermoforming or roll-forming, or may be formed by drilling, cutting, or punching the holes 160 after the projections 112 have been formed. In another embodiment, shown in FIG. 4, one or more slits 402 may be cut through the top surfaces 416 of some or all of the projections 412 on a membrane 400, which is the same as the membrane 100 of FIGS. 1-3 apart from the perforations. The slit 402 may extend partially or fully across the top surface 416 in a certain direction. The slit 402 may be sufficiently narrow to not compromise the structural integrity of the projection 412. In one example, the slit 402 is about 1 mm wide. Advantageously, the slit 402 may be formed during a continuous manufacturing process. For example, after the projections 412 are formed, the membrane 400 may be run through a slitter having one or more stationary blades. The slitter can cut the slits 402 continuously in a straight line from one end of the membrane 400 to the other, as shown in FIG. 4.

Figure 4:
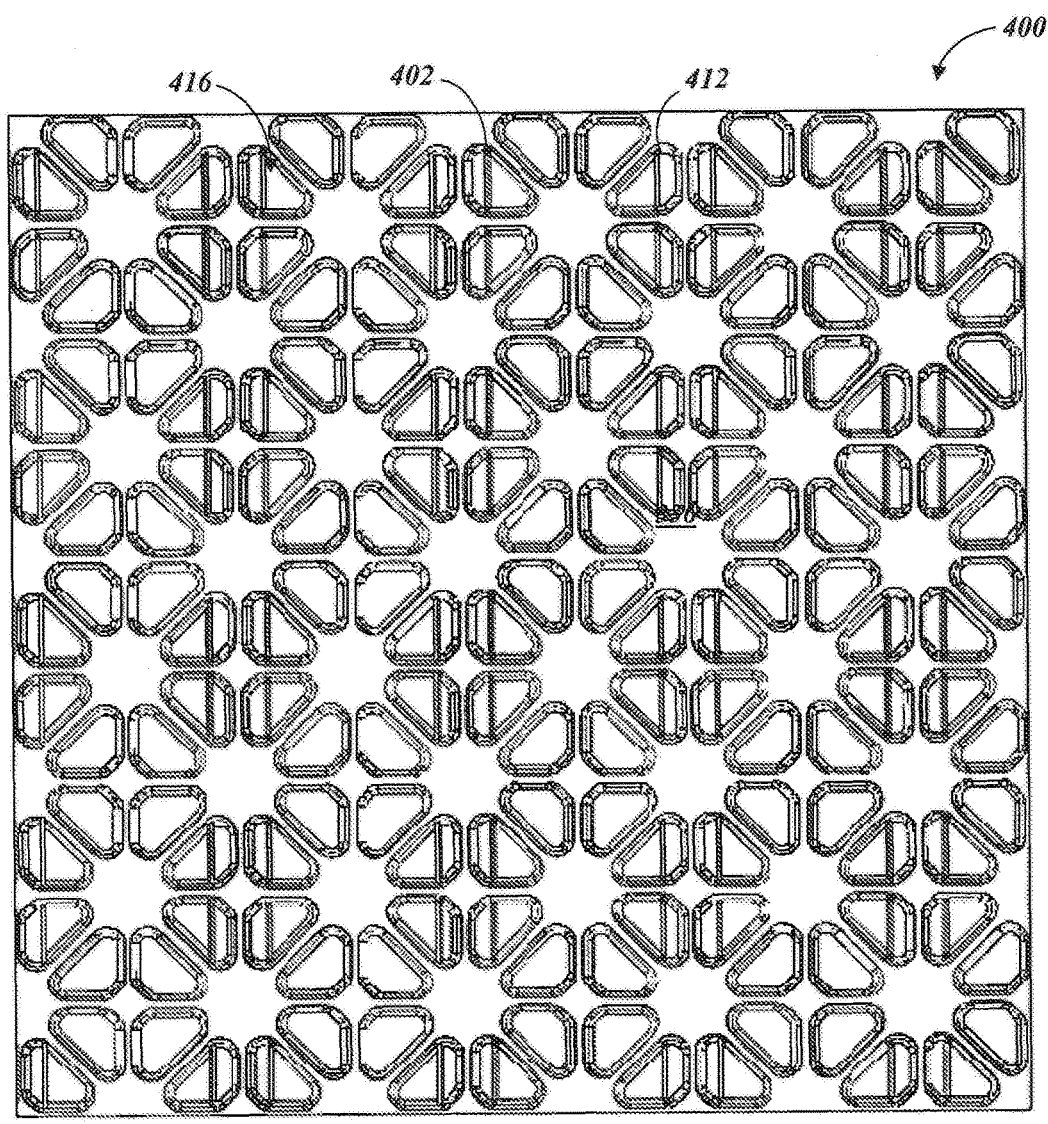
FIG. 4 is a top view of a second embodiment of a membrane for retaining heater cables in accordance with the present disclosure.
Figure 5:
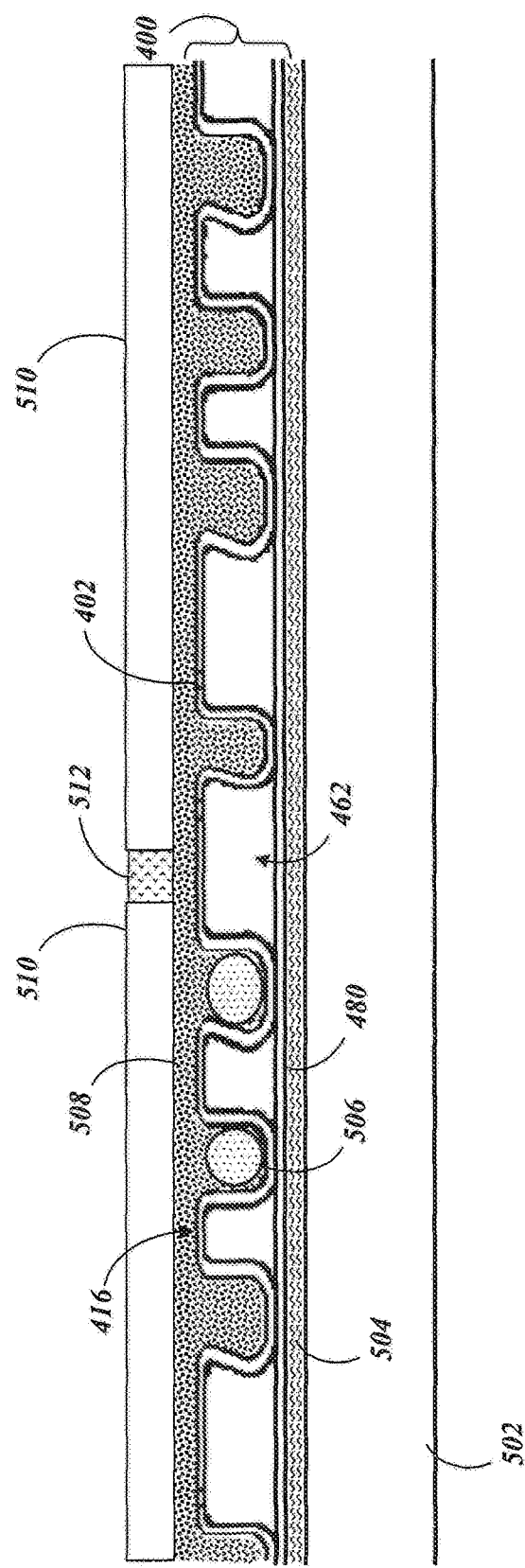
FIG. 5 is an enlarged cross-sectional side view showing an exemplary installation of the membrane of FIG. 4 in a heated floor.

FIG. 5 illustrates an exemplary assembled floor using the membrane 400 of FIG. 4. One embodiment of an installation method is as follows. As an initial step, or during installation, the installer carries a sufficient number of rolls (i.e., rolled segments) of the membrane 400 to the installation site. The installer may unroll the membrane 400 and cut the membrane 400, using any suitable hand tool, to the corresponding shape of the flooring area to be heated. With the subfloor 502 prepared for installation, the installer applies a layer of thin-set 504 to the subfloor 502. The installer lays the membrane 400 over the thin-set 504 with the fibrous layer 480 (or the underside of the base 402 if there is no fibrous layer 480) contacting the thin-set 504. After a suitable cure time, the installer installs the heater cable(s) 506 within the membrane 400 as described above. The installer then applies an adhesive layer 508, which may be thin-set, modified thin-set, concrete, or another suitable adhesive, over the membrane 400 and the heater cable 506.

The adhesive layer 508 may cover the membrane 400, filling the channels 420 and any empty volume around the heater cable 506, and settling atop and bonding to the top surfaces 416 of the projections 412. The adhesive layer 508 may pass through the slits 402, partially or completely filling the cavities 462 within the projections 412 and/or bonding to the top of the fibrous layer 480 or to the thin-set 504 underneath the membrane 400; or, as illustrated, the adhesive layer 508 may not pass through the slits 402 and the cavities 462 may remain full of air and/or other gasses. The installer may then install the main flooring (e.g., tile 510 and grout 512) over the adhesive layer 508.

Figure 6:
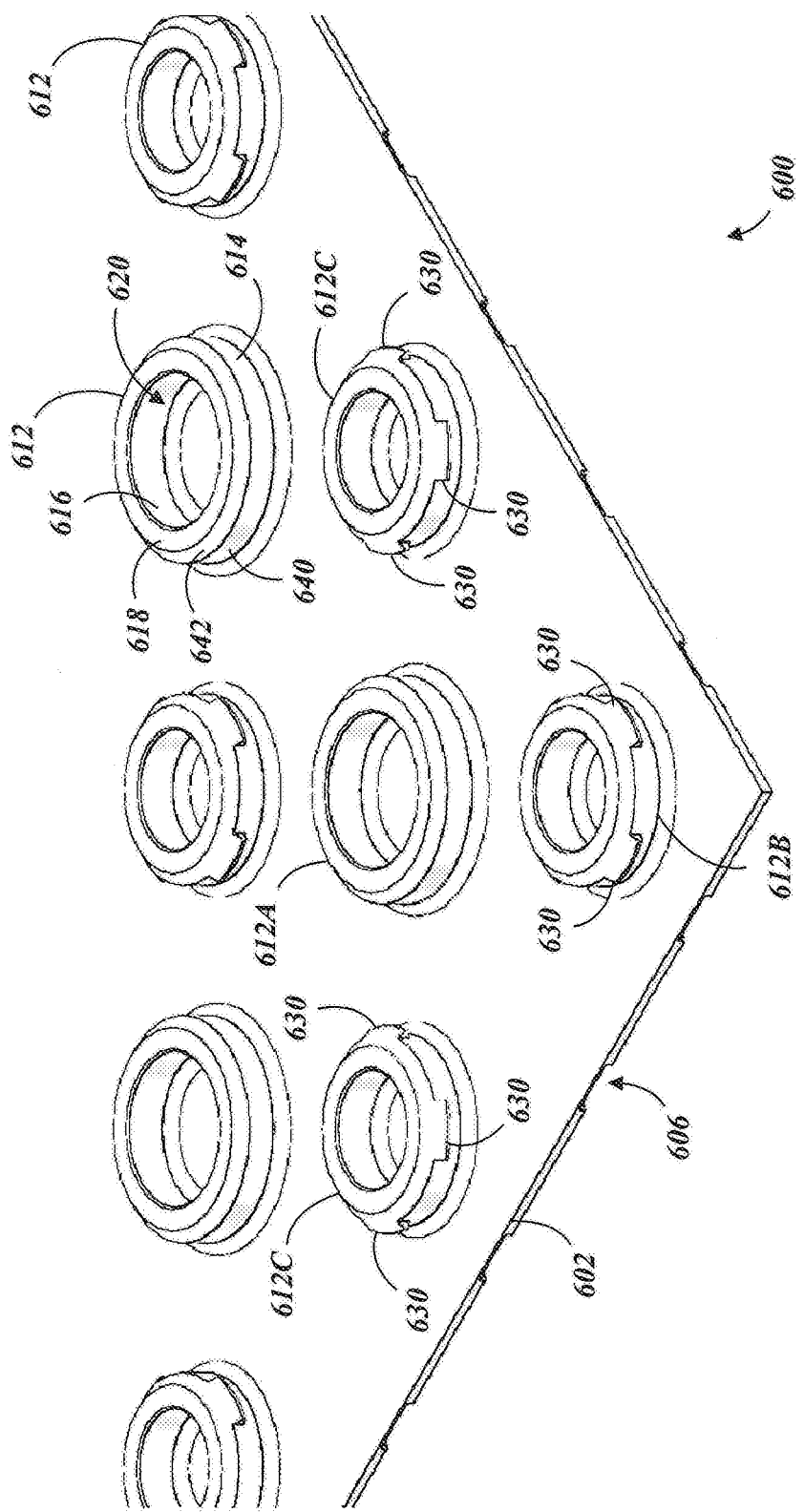
FIG. 6 is an isometric view of a third embodiment of a membrane for retaining heater cables in accordance with the present disclosure.

FIG. 6 illustrates another embodiment of an anti-fracture membrane 600 for retaining heater cables. The membrane 600 may include a base 602 having the same properties as those described above with respect to the base 102 of FIG. 1. Additionally or alternatively, one or more grooves 606 may be formed in the bottom surface of the base 602. The grooves 606 may direct away outgassing or curing vapors, as well as moisture escaping from the subfloor. Multiple projections 612 extend outward from the base 602 and are arranged in a layout that facilitates heater cable guidance and retention. The projections 612 may be formed and integrated with or attached to the base 602 using any of the techniques described above with respect to the projections 112 of FIG. 1. The projections 612 may be annular, as defined by a circular outer perimeter wall 614 and a circular inner perimeter wall 616 offset from the outer perimeter wall 614. A top surface 618 may extend between the top of the outer perimeter wall 614 and the top of the inner perimeter wall 616, leaving a circular recess 620 within each projection 612. The recess 620 may extend partially or fully down to the base 602. The bottom of the recess 620, which may be the base 602, may be perforated and/or textured to facilitate adhesive bonding as described above. The outer perimeter wall 614 may be entirely perpendicular to the base 602, or may include a perpendicular portion 640 extending upward from the base 602, and an intermediate portion 642 extending upward from the perpendicular portion 640 and radially inward (i.e., toward the recess 620) at an angle with respect to the base 602, to intersect the planar top surface 618.

In some embodiments, the projections 612 may have different outer and/or inner diameters. The illustrated membrane 600 includes projections 612 of two different sizes: large projections (e.g., projection 612A) align orthogonally with each other and are spaced uniformly from adjacent large projections in two directions; similarly, small projections (e.g., projections 612B, 612C) align orthogonally with each other and are spaced uniformly from adjacent small projections in the two orthogonal directions; further, the large projections are oriented at 45 degrees from adjacent small projections, and the spacing between adjacent large and small projections may also be uniform.

Each projection 612 may have one or more flanges 630, although some projections 612 may not have any flanges 630. In the illustrated example, all of the large projections lack flanges 630 and all of the small projections have four flanges 630 each, spaced uniformly around the perimeter of the projection. Each flange 630 may extend from the top surface 618 and/or from the top of the perpendicular portion 640 of the outer perimeter wall 614. In some embodiments, the flanges 630 may be flush with the intermediate portion 642 of the outer perimeter wall 614, as illustrated. The flanges 630 extend away from the outer perimeter wall 614, creating an overhand under which a heater cable may be retained.

In some embodiments, the flanges 630 on each projection 612 may be oriented so that none of the flanges 630 extend in the same or in the opposite direction as any of the flanges 630 of the adjacent projections 612. Thus, for example, one configuration of a small projection 612B has flanges 630 oriented in the orthogonal directions (i.e., toward the adjacent small projections 612C), and another configuration is used for each of the adjacent small projections 612C, in which the flanges 630 are oriented at a 45 degree offset from the orthogonal directions. Further, the flanges 630 have a width that is less than the distance between flanges 630, so that no two flanges 630 on adjacent projections 612 face each other.

The membrane 600 provides ample versatility for installing heater cables. An installer may "snake" or "weave" the cable(s) around adjacent projections 612 in any desired path; the flanges 630 combine with tensile forces from bending the cable around the projections 612 to retain the heater cable in place. A heated floor may be installed using the membrane 600 in the same manner described above with respect to FIG. 5.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. A membrane for decoupling heated flooring from a subfloor, the membrane comprising:
   a flexible base; and
   a plurality of projections formed into the base and extending outward from the base, each projection of the plurality of projections having:
      a perimeter wall defining a height of the projection and having a plurality of sides each intersecting with two other of the sides;
      a top surface integral with the perimeter wall; and exactly one flange portion extending from one of the sides of the perimeter wall;

the plurality of projections arranged so that:

each projection has, selected from the plurality of projections, a plurality of adjacent projections, and forms with each adjacent projection a corresponding channel of a plurality of channels;

for each channel of the plurality of channels, the corresponding flange portion of at most one of the projections forming the channel extends over the channel such that the channel retains a first heater cable for heating the heated flooring; and the corresponding flange portion of each projection does not face the same direction or the opposite direction of any of the corresponding flange portions of the plurality of adjacent projections.

2. The membrane of claim 1, wherein in each of the plurality of projections, each of the plurality of sides has a planar portion, the flange portion of the projection extending from the planar portion of one of the plurality of sides, and wherein the plurality of projections are further arranged so that the plurality of channels facilitate retention by the membrane of one or more heater cables traveling in a plurality of directions across the membrane, the one or more heater cables including the first heater cable.

3. The membrane of claim 2, wherein the corresponding plurality of sides of each of the plurality of projections cooperate to give the perimeter wall of the projection a substantially triangular shape.

4. The membrane of claim 2, wherein the corresponding plurality of sides of each of the plurality of projections cooperate to give the perimeter wall of the projection a substantially trapezoidal shape.

5. The membrane of claim 4, wherein the perimeter wall of each of the plurality of projections further comprises a plurality of rounded corners each disposed between a pair of adjacent sides of the plurality of sides, the plurality of rounded corners enabling the first heating cable to maintain contact with the perimeter wall as the first heating cable is bent around the projection.

6. The membrane of claim 1, wherein the plurality of projections are further arranged so that the plurality of channels facilitate retention by the membrane of a plurality of heater cables traveling in four or more directions across the membrane.

7. The membrane of claim 6, wherein the plurality of heater cables includes the first heater cable having a first diameter and a second heater cable having a second diameter different from the first diameter.

8. The membrane of claim 7, wherein each of the plurality of channels is configured to retain any of the plurality of heater cables having a diameter between about 4.1 mm and about 4.75 mm.

9. The membrane of claim 1, wherein:

the perimeter wall of each projection of the plurality of projections defines an interior of the projection;

the top surface of each projection is a substantially planar surface extending over the entirety of the interior of the projection; and each projection further comprises a slit disposed through the top surface to allow transmission through the membrane of one or more of a gas, a liquid, and a flooring adhesive, the corresponding slits of two or more of the plurality of projections forming a straight line from a first end of the membrane to a second end of the membrane opposite the first end.

* * * * *